United States Patent
Reithinger

(10) Patent No.: US 7,737,799 B2
(45) Date of Patent: Jun. 15, 2010

(54) DIGITAL PHASE MODULATOR AND CORRESPONDING METHOD

(75) Inventor: Jürgen Reithinger, Neunkirchen am Brand (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 136 days.

(21) Appl. No.: 12/148,118

(22) Filed: Apr. 16, 2008

(65) Prior Publication Data

US 2008/0258832 A1 Oct. 23, 2008

(30) Foreign Application Priority Data

Apr. 17, 2007 (DE) .................... 10 2007 018 087

(51) Int. Cl.
*H04L 27/20* (2006.01)
(52) U.S. Cl. .................... 332/103; 332/104; 375/308
(58) Field of Classification Search ......... 332/103–105; 375/308
See application file for complete search history.

(56) References Cited

U.S. PATENT DOCUMENTS

| | | | |
|---|---|---|---|
| 3,781,706 A * | 12/1973 | Osborne et al. ............... | 331/45 |
| 4,206,423 A | 6/1980 | Nossen | |
| 4,562,415 A | 12/1985 | McBiles | |
| 4,794,621 A * | 12/1988 | Dirr ............................ | 375/279 |
| 6,791,596 B2 * | 9/2004 | Nihei et al. .................. | 347/247 |

FOREIGN PATENT DOCUMENTS

EP 0 551 573 A2 7/1993

* cited by examiner

*Primary Examiner*—David Mis

(57) ABSTRACT

A simple, interference-free digital phase modulator is to be provided. To this end, the phase modulator is provided with a counter for outputting a counter signal on the basis of a predetermined clock signal and a comparator, which receives a current counter state from the counter, in order to record a digital input signal. The comparator compares the input signal with the current counter state on the basis of a predetermined allocation table and resets the counter, if the input signal corresponds to a counter state assigned via the allocation table. A predetermined signal value of the output counter signal is herewith phase-modulated as a function of the input signal. As only one phase position is generated with the circuit at any point in time, interferences, which are produced by the digital phase modulator itself, are significantly less.

21 Claims, 3 Drawing Sheets

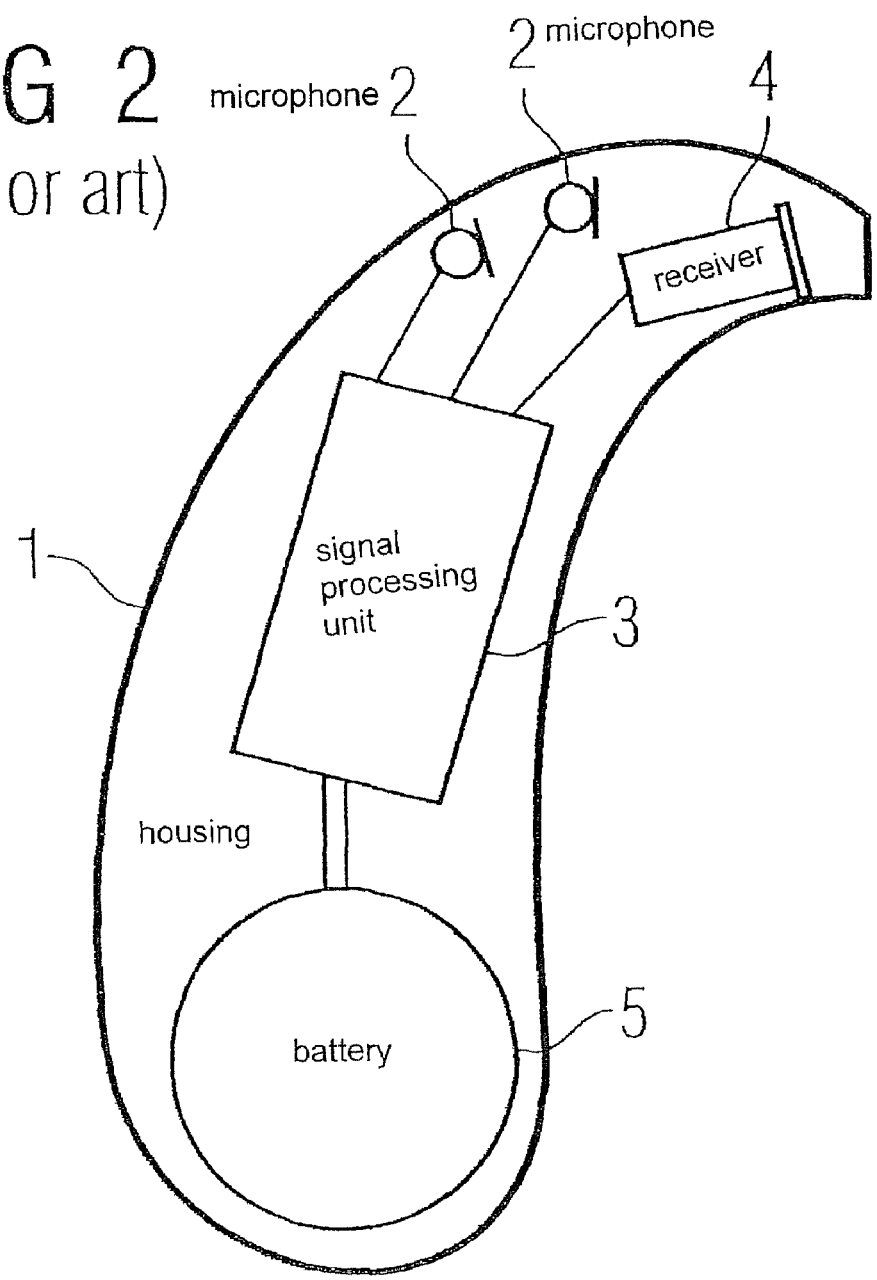

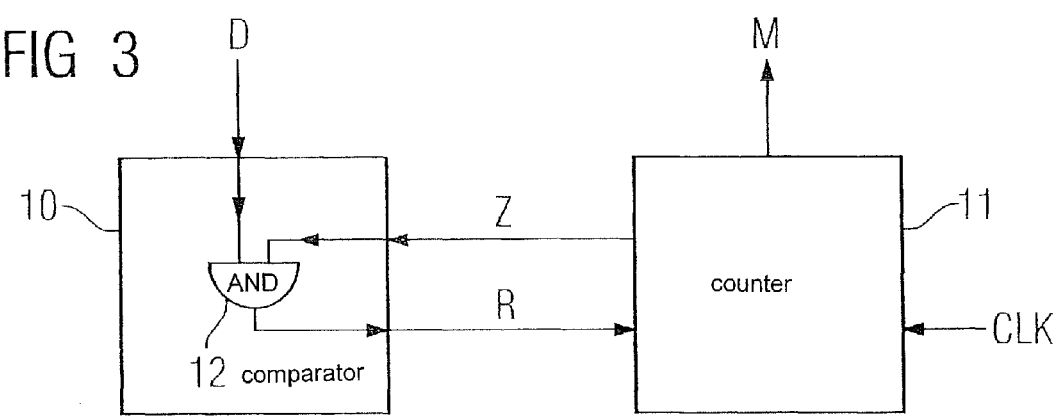

DIGITAL PHASE MODULATOR AND CORRESPONDING METHOD

CROSS REFERENCE TO RELATED APPLICATIONS

This application claims priority of German application No. 10 2007 018 087.1 DC filed Apr. 17, 2007, which is incorporated by reference herein in its entirety.

FIELD OF INVENTION

The present invention relates to a digital phase modulator and a corresponding method for generating a phase-modulated signal. In particular, the digital phase modulator and the method can be used for a hearing device.

BACKGROUND OF INVENTION

In order to transmit data by radio, modulations, for instance the amplitude modulation, the frequency modulation or the phase modulation, of a carrier signal are generally carried out. A suitable method is to be selected for each modulation. The individual methods are mostly comparatively complicated to realize in the hardware and an integration of this hardware into digital electronic modules such as ASICs, FPGAs, CPLDs and suchlike is barely possible.

Previous modulators generally operate according to FIG. 1 with voltage-controlled oscillators and a number of simultaneously available phase branches. In the example in FIG. 1, an input signal $\phi(t)$ of the phase modulator is fed into two sub branches. The cosine part and the sine part of the signal are determined in the first and second branch respectively. The two parts are moved in the respective branch with a desired phase $\Omega_T t$. They are then combined in an adder to form the phase-modulated signal PM. A digital phase modulator of this type is described in the publication EP 0 551 573 A2.

Furthermore, a digital phase modulator is likewise known from the patent application U.S. Pat. No. 4,206,423 A, in which all phases are generated. Two phases are especially generated with separate clock modules. The phase that is needed is selected with the aid of a phase selector logic. During the realization of such a phase modulator, many lines for signals of different phases of the same frequency are to be run. The results are correspondingly high interferences.

Wireless communication is also being used increasingly in hearing devices. Particularly in the case of transmitting digital signals, phase modulation can also be advantageous here. As hearing devices are however generally designed to be structurally very small, the lines lie correspondingly close to one another such that with conventional phase modulation methods, more interferences result.

Hearing devices are portable hearing apparatuses which are used to supply the hard-of-hearing. To accommodate the numerous individual requirements, different configurations of hearing devices such as behind-the-ear hearing devices (BTE), in-the-ear hearing devices (ITE), e.g. including concha hearing devices or completely-in-the-channel hearing devices (CIC), are provided. The hearing devices designed by way of example are worn on the outer ear or in the auditory canal. Furthermore, bone conduction hearing aids, implantable or vibrotactile hearing aids are also available on the market. In such cases the damaged hearing is stimulated either mechanically or electrically.

Essential components of the hearing devices include in principle an input converter, an amplifier and an output converter. The input converter is generally a receiving transducer, e.g. a microphone and/or an electromagnetic receiver, e.g. an induction coil. The output converter is mostly realized as an electroacoustic converter, e.g. a miniature loudspeaker, or as an electromechanical converter, e.g. a bone conduction receiver. The amplifier is usually integrated into a signal processing unit. This basic configuration is shown in the example in FIG. 1 of a behind-the-ear hearing device. One or a number of microphones 2 for recording the ambient sound are incorporated in a hearing device housing 1 to be worn behind the ear. A signal processing unit 3, which is similarly integrated into the hearing device housing 1, processes the microphone signals and amplifies them. The output signal of the signal processing unit 3 is transmitted to a loudspeaker and/or receiver 4, which outputs an acoustic signal. The sound is optionally transmitted to the ear drum of the device wearer via a sound tube, which is fixed with an otoplastic in the auditory canal. The power supply of the hearing device and in particular of the signal processing unit 3 is provided by a battery 5 which is likewise integrated into the hearing device housing 1.

SUMMARY OF INVENTION

The object of the present invention consists in proposing a phase modulator, which requires as little installation space as possible and which is impaired as little as possible by interferences. A corresponding method is also to be specified.

This object is achieved in accordance with the invention by a digital phase modulator with a counter for outputting a counter signal on the basis of a predetermined clock signal and a comparator, which receives a current counter state from the counter, for recording a digital input signal, comparing the input signal with the current counter state on the basis of a predetermined allocation table and for resetting the counter, if the input signal corresponds to a counter state assigned by the allocation table, so that a predetermined signal value of the output counter signal is phase-modulated as a function of the input signal.

Provision is also made in accordance with the invention for a method for generating a phase-modulated digital signal by continuously increasing and decreasing a counter on the basis of a predetermined clock signal, assigning each of several input signal values to a counter value of the counter, comparing a current input signal value with a current counter value and resetting the counter, if the input signal value corresponds to the assigned counter value, so that a predetermined signal value of the output counter signal is phase-modulated as a function of the input signal.

The phase modulation is thus advantageously achieved using only one signal branch. The interferences through the system itself are then significantly less, since only one phase position exists at any one point in time and not several simultaneously.

In the case of the digital phase modulator, the predetermined signal value is preferably the MSB (most significant bit) of the counter. The phase shift can then be easily closely linked to the position of the MSB. In principle of course other values of the counter can also be used for the predetermined signal value.

The clock signal is to have at least twice the frequency of the input signal, if the input signal is subjected to a BPSK modulation (Binary-Phase-Shift-Keying). If by contrast a QPSK modulation (Quadrature-Phase-Shift-Keying) is carried out, it is necessary for the clock signal to have at least four times the frequency of the input signal. Particularly for transmission frequencies in the LW, MW and KW range, clock generators of this type are available without any problems.

It is also advantageous if the counter is clocked with a quartz oscillator. Very stable phase jumps can thus be achieved.

According to a further advantageous embodiment, the counter, the comparator and a transmission stage are integrated in a common logic module. In this way, a phase modulator with minimal installation space and transmission functionality can be realized very easily. Only the external antenna need still be connected.

The use of the inventive digital phase modulator and/or the said inventive method in a hearing device is particularly advantageous. It is possible in this case to profit particularly from the minimal installation size of this digital phase modulator as well as from the associated reduced interferences. Furthermore, it can also be used with associated remote controllers.

BRIEF DESCRIPTION OF THE DRAWINGS

The present invention is described in more detail based on the appended drawings, in which;

FIG. 2 shows the basic design of a hearing device as claimed in the prior art and FIG. 3 shows the basic design of a digital phase modulator as claimed in the present invention.

DETAILED DESCRIPTION OF INVENTION

Figure 1:
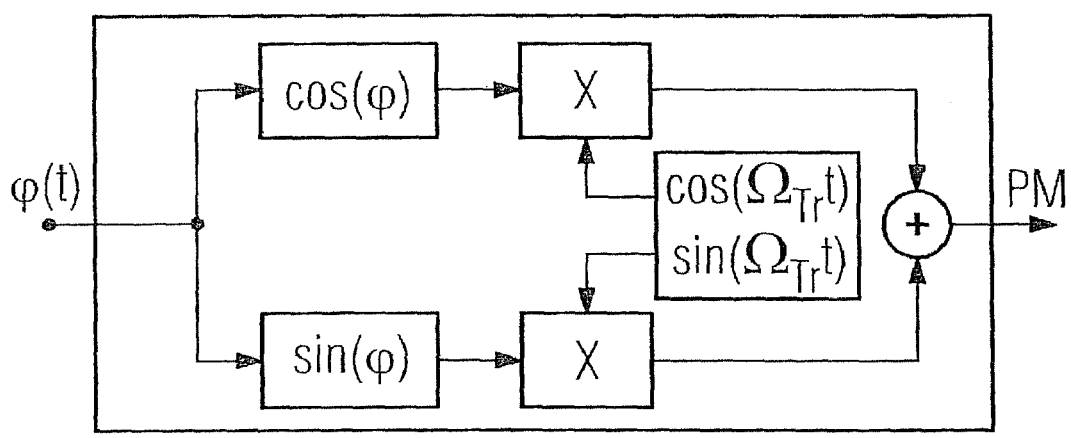
FIG. 1 shows a circuit diagram of a phase modulator as claimed in the prior art.

The exemplary embodiment illustrated in more detail below represents a preferred embodiment of the present invention.

The exemplary embodiment of an inventive digital phase modulator reproduced in FIG. 3 only consists of two essential components, a comparator 10 and a counter 11. The comparator 10 receives the digital data D, which is to be modulated in its phase. The comparator 10 also receives a counter state Z from the counter 11. The data D and the counter state Z, symbolized by an AND element, are compared with one another in the comparator 10. The output signal of the AND element 12 is used as a reset signal R for synchronously resetting the counter 11 and is accordingly fed hereto.

The counter 11 is itself fed by a clock CLK, which has a much higher frequency than the input signal D. The output signal M of the counter 11 is the correspondingly phase-modulated input signal.

For digital data transmission, it can also be seen from FIG. 3 that in the case of the phase modulator, a simple binary counter 11 can be used instead of several signal branches for signals with the respective phase positions. It counts for instance for BPSK from 0 to 3 and/or for QPSK/BPSK from 0 to 7. The counter 11 is operated with a multiple of the transmission frequency, with the size of the multiple depending on the desired modulation method. For low transmission frequencies in the lower megahertz range (LW, MW, KW), counters are readily available with accordingly high clock frequencies. The multiple and/or the multiplier compared with the transmission frequency is for instance at least two in the case of BPSK modulation and at least four in the case of QPSK modulation. The multiplier results directly from the phase jumps. The ratio: phase jump×multiplier=360° applies here.

The counter 11 is synchronously reset by way of the comparator 10, if the comparator 10 detects one or several input data bits and the associated counter state. If the input signal D consists for instance of two bit data, the phase modulation can take place such that the counter state 1 is assigned to the value 00, the counter state 3 is assigned to the value 01, the counter state 5 is assigned to the value 10 and the counter state 7 is assigned to the value 11. The counter has eight times the frequency compared with the input signal. In other words, provided a data value is present, the counter counts from 1 to 8 and/or from 0 to 7. If the two values correspond, the comparator 10 outputs a reset signal R to the counter 11. The counter 11 sends its MSB as an output signal M. The MSB is temporally closely linked to the reset and the reset is in turn carried out as a function of the input data D. The input data D is thus output by the counter 11 in a phase-modulated fashion. A shift is thus generated in the counter 11, since, depending on the input signal, it does not pass through the complete counter range, but is only part of the counter range in accordance with the position at which the reset is triggered.

As FIG. 3 shows, a phase modulation can be realized in a simple fashion by means of digital modules. The counter 11 can be clocked here with a quartz oscillator (CLK). Quartz-stable transmission frequencies and very precise phase jumps thus result. The different phase positions also do not need to be permanently available. Considerably fewer interference signals are herewith produced as a result of interferences. Only the transmission frequency with the current phase position is generated here. In other words, as the other phase positions are not present, no interferences result between the phase positions. The phase jump is only generated when it is needed.

A concrete realization can consist in the comparator 10 and the counter 11 being integrated into a logic circuit, such as a CPLD, ASIC etc. The output of the circuit supplies the modulated transmission signal and may be applied to a transmission amplifier. With low transmitting powers, it is possible to dispense with an amplifier of this type. In this case, an antenna can be directly connected to the logic module, in order to realize a complete transmitter.

If required, data processing can optionally likewise be accommodated in the same module. A one IC transmitter can thus be realized by means of simple, cost-effective logic modules. If a logic module is already available in the system, this can be used for the transmitter and the modulator. No additional switching outlay is produced in this case, as a result of which cost-effective solutions can be realized. This is particularly advantageous for remote controllers.

The invention claimed is:

1. A digital phase modulator, comprising:
    a counter includes a predetermined clock signal input and a reset input and provides a counter state output, and a output signal; and
    a comparator receives the counter state from the counter and receives a digital input signal, the comparator compares the input signal with received current counter state on the basis of a predetermined allocation table and produces a reset signal for the counter, the reset signal resets the counter when the input signal corresponds to a counter state assigned via the allocation table,
    wherein a predetermined signal value of the output signal is phase-modulated as a function of the input signal, and
    wherein the clock signal has at least twice the frequency of the input signal and the input signal is subjected to a BPSK modulation via the counter.

2. The digital phase modulator as claimed in claim 1, wherein the predetermined signal value is the MSB of the counter.

3. The digital phase modulator as claimed in claim 1, wherein the clock signal has at least four times the frequency of the input signal and the input signal is subjected to a QPSK modulation by means of the counter.

4. The digital phase modulator as claimed in claim 1, wherein the counter is clocked with a quartz oscillator.

5. A digital phase modulator, comprising:
a counter includes a predetermined clock signal input and a reset input and provides a counter state output, and a output signal; and
a comparator receives the counter state from the counter and receives a digital input signal, the comparator compares the input signal with received current counter state on the basis of a predetermined allocation table and produces a reset signal for the counter, the reset signal resets the counter when the input signal corresponds to a counter state assigned via the allocation table,
wherein a predetermined signal value of the output signal is phase-modulated as a function of the input signal, and
wherein the counter, the comparator and a transmission stage are integrated in a common logic module.

6. The digital phase modulator as claimed in claim 5, wherein the modulator is incorporated within a hearing device.

7. The digital phase modulator as claimed in claim 5, wherein the modulator is incorporated within a remote controller.

8. The digital phase modulator as claimed in claim 5, wherein the clock signal has at least twice the frequency of the input signal and the input signal is subjected to a BPSK modulation via the counter.

9. The digital phase modulator as claimed in claim 8, wherein the clock signal has at least four times the frequency of the input signal and the input signal is subjected to a QPSK modulation by means of the counter.

10. The digital phase modulator as claimed in claim 5, wherein the counter is clocked with a quartz oscillator.

11. The digital phase modulator as claimed in claim 5, wherein the predetermined signal value is the MSB of the counter.

12. A method for generating a phase-modulated digital signal, comprising:
continuously increasing or decreasing a counter on the basis of a predetermined clock signal;
assigning each of a plurality of input signal values to a counter value of the counter;
comparing a current input signal value with a current counter value; and
resetting the counter when the current input signal value corresponds to the associated counter value, such that a predetermined signal value of the output counter signal is phase-modulated as a function of the input signal,
wherein the clock signal has at least twice the frequency of the input signal and the input signal is subjected to a BPSK modulation by means of the counter.

13. The method as claimed in claim 12, wherein the predetermined signal value is the MSB of the counter.

14. The method as claimed in claim 12, wherein the clock signal has at least four times the frequency of the input signal, and the input signal is subjected to a QPSK modulation by means of the counter.

15. A hearing device, comprising:
a digital phase modulator, comprising:
a counter that outputs a counter signal based on a predetermined clock signal, and
a comparator, which contains a current counter state from the counter, for recording a digital input signal, comparing the input signal with the current counter state based on a predetermined allocation table and for resetting the counter, when the input signal corresponds to a counter state assigned via the allocation table, so that a predetermined signal value of the output counter signal is phase-modulated as a function of the input signal,
wherein the clock signal has at least twice the frequency of the input signal and the input signal is subjected to a BPSK modulation via the counter.

16. The hearing device as claimed in claim 15, wherein the clock signal has at least four times the frequency of the input signal and the input signal is subjected to a QPSK modulation by means of the counter.

17. A remote controller, comprising:
a digital phase modulator, comprising:
a counter that outputs a counter signal based on a predetermined clock signal, and
a comparator, which contains a current counter state from the counter, for recording a digital input signal, comparing the input signal with the current counter state based on a predetermined allocation table and for resetting the counter, when the input signal corresponds to a counter state assigned via the allocation table, so that a predetermined signal value of the output counter signal is phase-modulated as a function of the input signal,
wherein the clock signal has at least twice the frequency of the input signal and the input signal is subjected to a BPSK modulation via the counter.

18. The remote controller as claimed in claim 17, wherein the clock signal has at least four times the frequency of the input signal and the input signal is subjected to a QPSK modulation by means of the counter.

19. A method for generating a phase-modulated digital signal, comprising:
continuously increasing or decreasing a counter on the basis of a predetermined clock signal;
assigning each of a plurality of input signal values to a counter value of the counter;
comparing a current input signal value with a current counter value; and
resetting the counter when the current input signal value corresponds to the associated counter value, such that a predetermined signal value of the output counter signal is phase-modulated as a function of the input signal,
wherein the counter, the comparator and a transmission stage are integrated in a common logic module.

20. The method as claimed in claim 19, wherein the clock signal has at least twice the frequency of the input signal and the input signal is subjected to a BPSK modulation by means of the counter.

21. The method as claimed in claim 19, wherein the clock signal has at least four times the frequency of the input signal, and the input signal is subjected to a QPSK modulation by means of the counter.

* * * * *